United States Patent
Lee et al.

(10) Patent No.: US 12,195,610 B2
(45) Date of Patent: Jan. 14, 2025

(54) LOW DENSITY POLYETHYLENE WITH ENHANCED HOT TACK STRENGTH AND ADHESION-TO-METAL BY THE ADDITION OF IONOMERS

(71) Applicant: Dow Global Technologies LLC, Midland, MI (US)

(72) Inventors: Jong Young Lee, Lake Jackson, TX (US); Yifan Dong, Lake Jackson, TX (US); Barry Alan Morris, Wilmington, DE (US); Teresa P. Karjala, Lake Jackson, TX (US); Eva-Maria Kupsch, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 470 days.

(21) Appl. No.: 17/631,107

(22) PCT Filed: Jul. 30, 2020

(86) PCT No.: PCT/US2020/044200
§ 371 (c)(1),
(2) Date: Jan. 28, 2022

(87) PCT Pub. No.: WO2021/022010
PCT Pub. Date: Feb. 4, 2021

(65) Prior Publication Data
US 2022/0275180 A1 Sep. 1, 2022

Related U.S. Application Data (60) Provisional application No. 62/880,837, filed on Jul. 31, 2019.

(51) Int. Cl.
*C08L 23/06* (2006.01)
*C08L 23/08* (2006.01)
(Continued)

(52) U.S. Cl.
CPC ........... *C08L 23/06* (2013.01); *C08L 23/0869* (2013.01); *C08L 33/08* (2013.01); *C08L 33/10* (2013.01);
(Continued)

(58) Field of Classification Search
CPC ... C09D 123/06; C08L 33/02; C08L 23/0815; C08L 23/06
See application file for complete search history.

(56) References Cited

U.S. PATENT DOCUMENTS 3,264,272 A 8/1966 Rees
3,322,734 A 5/1967 Rees et al.
(Continued)

FOREIGN PATENT DOCUMENTS

CN 104080851 A 10/2014
EP 0721975 A1 7/1996
(Continued)

OTHER PUBLICATIONS

Chinese Office Action dated Sep. 29, 2023, pertaining to CN Patent Application No. 202080053890.6, 14 pgs.
(Continued)

*Primary Examiner* — Eli D. Strah
(74) *Attorney, Agent, or Firm* — Dinsmore & Shohl LLP (57) ABSTRACT

Polymer blends, films, and coated substrates that include the polymer blends. The polymer blends include at least 90% by weight low density polyethylene polymer and from 1 to 10% by weight ionomer. The LDPE polymer has a melt index ($I_2$) from 2 g/10 mins to 6 g/10 mins, and a molecular weight distribution from 5 to 11 as determined by a conventional gel permeation chromatography method. The ionomer includes an ethylene acid copolymer, in which from 15% to 70% of acid groups are neutralized by sodium cation based on the total number of acid groups in the acid copolymer. The
(Continued)

ethylene acid copolymer is the polymerized reaction product of: at least 50% by wt. ethylene, from 2 wt. % to 40 wt. % of monocarboxylic acid monomer, and from 0 to 20 wt. % of alkyl acrylate, based on the total wt. % of the monomers present in the ethylene acid copolymer.

18 Claims, 1 Drawing Sheet

(51) Int. Cl.
| | |
|---|---|
| C08L 33/08 | (2006.01) |
| C08L 33/10 | (2006.01) |
| C09D 123/06 | (2006.01) |
| C09D 123/08 | (2006.01) |
| C09D 133/08 | (2006.01) |
| C09D 133/10 | (2006.01) |

(52) U.S. Cl.
 CPC ..... *C09D 123/06* (2013.01); *C09D 123/0869* (2013.01); *C09D 133/08* (2013.01); *C09D 133/10* (2013.01); *B05D 2507/00* (2013.01); *B05D 2508/00* (2013.01); *C08L 2207/066* (2013.01)

(56) References Cited

U.S. PATENT DOCUMENTS

| | | | |
|---|---|---|---|
| 3,410,928 | A | 11/1968 | Baum |
| 3,857,754 | A | 12/1974 | Hirata et al. |
| 4,312,902 | A | 1/1982 | Murase et al. |
| 4,766,174 | A | 8/1988 | Statz |
| 6,437,046 | B1 | 8/2002 | Morris |
| 6,500,556 | B1 | 12/2002 | Morris et al. |
| 7,820,776 | B2 | 10/2010 | Neuteboom et al. |
| 8,541,081 | B1 | 9/2013 | Ranganathan et al. |
| 9,228,036 | B2 | 1/2016 | Berbee et al. |
| 9,334,348 | B2 | 5/2016 | Berbee et al. |
| 9,394,389 | B2 | 7/2016 | Berbee et al. |
| 9,783,352 | B2 | 10/2017 | Hausmann et al. |
| 10,144,789 | B2 | 12/2018 | Nummila-Pakarinen et al. |
| 2002/0198323 | A1* | 12/2002 | Morris .................. C09J 123/06 525/240 |
| 2004/0043238 | A1 | 3/2004 | Wuest et al. |
| 2006/0014871 | A1 | 1/2006 | Toriumi et al. |
| 2006/0073297 | A1* | 4/2006 | Glick .................. C08L 23/0815 428/36.1 |
| 2007/0225445 | A1 | 9/2007 | Nguyen |
| 2009/0131593 | A1 | 5/2009 | Perdomi |
| 2016/0304638 | A1 | 10/2016 | Den Doelder et al. |

FOREIGN PATENT DOCUMENTS

| | | | | |
|---|---|---|---|---|
| EP | 1325092 | A2 | 7/2003 | |
| EP | 1854626 | A1 | 11/2007 | |
| EP | 2156949 | B1 | 11/2014 | |
| GB | 1041065 | A | 9/1966 | |
| JP | H03192607 | A | 8/1991 | |
| JP | H09109324 | A | 4/1997 | |
| JP | 2002500250 | A | 1/2002 | |
| JP | 2003118048 | A | 4/2003 | |
| JP | 2000001556 | A | 11/2007 | |
| JP | 2015000883 | A | 1/2015 | |
| JP | 2015503664 | A | 2/2015 | |
| WO | 0107531 | A2 | 2/2001 | |
| WO | 0228974 | A2 | 4/2002 | |
| WO | WO-2005005534 | A1 * | 1/2005 | ............. C08L 23/04 |
| WO | 2013083285 | A1 | 6/2013 | |
| WO | 2018094199 | A1 | 5/2018 | |
| WO | WO-2018094197 | A1 * | 5/2018 | ........... B32B 15/082 |
| WO | 2019022974 | A1 | 1/2019 | |

OTHER PUBLICATIONS

Communication pursuant to Article 94(3) EPC dated Sep. 29, 2023, pertaining to EP Patent Application No. 20754539.3, 3 pgs.
Brazil Office Action dated Oct. 24, 2023, pertaining to BR Patent Application No. BR112022001345-0, 4 pgs.
Brazil Office Action dated Oct. 17, 2023, pertaining to BR Patent Application No. BR112022001238-1, 6 pgs.
Brazil Office Action dated Oct. 24, 2023, pertaining to Brazilian Patent Application No. BR112022001549-6, 3 pgs.
161/162 Communication dated Mar. 9, 2022, pertaining to European Patent Application No. 20754597.1, 3 pgs.
International Preliminary Report on Patentability dated Feb. 1, 2022, pertaining to PCT/2020/044200, 6 pgs.
161/162 Communication dated Mar. 9, 2022, pertaining to European Patent Application No. 20754539.1, 3 pgs.
International Preliminary Report on Patentability dated Feb. 10, 2022, pertaining to PCT Application No. PCT/US2020/043485, 6 pgs.
International Preliminary Report on Patentability dated Feb. 1, 2022, pertaining to PCT Application No. PCT/US2020/043658, 6 pgs.
161/162 Communication dated Mar. 9, 2022, pertaining to European Patent Application No. 20754551.8, 3 pgs.
ID Office Action dated Aug. 14, 2023, pertaining to ID Patent Application No. P00202201366, 6 pgs.
Chinese Office Action dated Nov. 21, 2023, pertaining to CN Patent Application No. 202080052468.9, 14 pgs.
Chinese Office Action dated Dec. 7, 2023, pertaining to CN Patent Application No. 202080055564.9, 14 pgs.
Russian Office Action dated Jan. 17, 2024, pertaining to RU Patent Application No. 2022 104 735, 20 pgs.
US Final Office Action dated May 14, 2024, pertaining to U.S. Appl. No. 17/631,150, 15 pgs.
Chinese Office Action dated May 22, 2024, pertaining to CN Patent Application No. 202080052468.9, 14 pgs.
Indonesia Substantive Examination Report dated Apr. 4, 2024, pertaining to ID Patent Application No. P00202201385, 6 pgs.
US Non-Final Office Action dated Apr. 25, 2024, pertaining to U.S. Appl. No. 17/631,091, 7 pgs.
Balke et al. "A Strategy for Interpreting Multidetector Size-Exclusion Chromatograph Data II", Multidetector SEC Data In Plastic Waste Recovery (1992), 11 pgs.
International Search Report and Written Opinion dated Oct. 12, 2020, pertaining to Int'l Appl. No. PCT/US2020/043485 filed Jul. 24, 2020, 12 pgs.
International Search Report and Written Opinion dated Nov. 30, 2020, pertaining to Int'l Appl. No. PCT/US2020/044200 filed Jul. 30, 2020, 14 pgs.
International Search Report and Written Opinion dated Apr. 29, 2020, pertaining to Int'l Appl. No. PCT/CN2019/098558 filed Jul. 31, 2019, 11 pgs.
International Search Report and Written Opinion dated Oct. 28, 2020, pertaining to Int'l Appl. No. PCT/US2020/043658 filed Jul. 27, 2020, 14 pgs.
Kratochvil, P., Classical Light Scattering from Polymer Solutions, Elsevier, Oxford, NY (1987), 32 pgs.
Mourey et al. "A Strategy for Interpreting Multidetector Size-Exclusion Chromatography Data I" Systematic Approach to Multidetector SEC Data (1992), 11 pgs.
Williams et al. "The Construction of a Polyethylene Calibration Curve for Gel Permeation Chromatography Using Polystyrene Fractions" vol. 6, pp. 621-624 (1968), 4 pgs.
Zimm "Apparatus and Methods for Measurement and Interpretation of the Angular Variation of Light Scattering; Preliminary Results on Polystyrene Solutions" The Journal of Chemical Physics vol. 16, No. 12 (1948), 18 pgs.
Argentine Substantive Examination Report dated Jan. 18, 2024, pertaining to AR Patent Application No. 20200102036, 2 pgs.
Argentine Substantive Examination Report dated Jan. 18, 2024, pertaining to AR Patent Application No. 20200102033, 2 pgs.
Argentine Substantive Examination Report dated Mar. 1, 2024, pertaining to AR Patent Application No. 20200102022, 3 pgs.

(56) References Cited

OTHER PUBLICATIONS

Chinese Office Action dated Jun. 27, 2024, pertaining to CN Patent Application No. 202080055564.9, 10 pgs.
Japanese Office Action dated Aug. 6, 2024, pertaining to JP Patent Application No. 2022-50191, 12 pgs.
Japanese Office Action dated Aug. 20, 2024, pertaining to JP Patent Application No. 2022-505490, 8 pgs.
Japanese Office Action dated Jul. 23, 2024, pertaining to JP Patent Application No. 2022-504158, 10 pgs.
European Article 94(3) Communication dated Jul. 31, 2024, pertaining to EP Patent Application No. 20754539.3, 3 pgs.
US Notice of Allowance dated Oct. 15, 2024, pertaining to U.S. Appl. No. 17/631,150, 10 pgs.
US Office Action dated Oct. 9, 2024, pertaining to U.S. Appl. No. 17/631,091, 9 pgs.
Chinese Office Action dated Aug. 26, 2024, pertaining to CN Patent Application 2020800524689, 14 pgs.

\* cited by examiner

LOW DENSITY POLYETHYLENE WITH ENHANCED HOT TACK STRENGTH AND ADHESION-TO-METAL BY THE ADDITION OF IONOMERS

CROSS-REFERENCE TO RELATED APPLICATIONS

This application is a National Stage Entry under 35 U.S.C. § 371 of International Patent Application No. PCT/US2020/044200, filed Jul. 30, 2020, which claims priority to U.S. Provisional Patent Application No. 62/880,837, filed on Jul. 31, 2019, the entire disclosures of both of which are hereby incorporated by reference.

TECHNICAL FIELD

Embodiments of the present disclosure generally relate to polymer blends for extrusion coating having improved hot tack strength when compared to LDPE polymers, and improved adhesion to metal of the polymer blends; and to films and coated substrates that include the polymer blends.

BACKGROUND

Low density polyethylene (LDPE) is widely used in the extrusion coating process to make food packaging, e.g. coated paperboard milk cartons and coated films for condiment sachets. The LDPE coating provides hermetic seals to protect the product from leaking. During the sealing process, the seal area is heated to melt and bond the sealant. Hot tack is the ability of the newly, formed seal to stay bonded prior to its cooling back to a solid state. A high hot tack strength is needed to form strong seals in a package, such that the seal prevents leakage.

Generally, LDPE has poor hot tack strength. This is generally believed to be due to the high level of long-chain branching of LDPE polymers. Long chain branching impedes molecular diffusion at the interface between the two contact surfaces during heat sealing. This diffusion is needed to develop hot tack strength and a lack of diffusion, such as is due to the highly tortuous path created by long-chain branching, results in low hot tack. Hot tack is further decreased for LDPE polymers with low melt index, typically less than 6.0 dg/min. Usually, a low melt index indicates higher molecular weight, which also slows diffusion at the interface.

A strong peel strength is needed to prevent the delamination between the coating and the substrate to maintain the integrity of the packaging. To enable polyethylene coatings to bond with polar substrates, the polyethylene coatings needs to be oxidized. Generally, the polyethylene coatings are oxidized with a long time in the air gap and at high temperature. However, this method does not create consistently improved peel strengths.

SUMMARY

Ongoing needs exist to create a polymer or polymer blend that when coated onto a substrate has a peak hot tack strength of greater than 9.5 N/inch with a seal bar temperature of 120° C. to 160° C. and a peak load peel strength of greater than 2 N/inch.

Embodiments of this disclosure include a polymer blend. The polymer blend includes at least 90% by weight of a low density polyethylene (LDPE) polymer and from 1% to 10% by weight of an ionomer. The LDPE polymer has a melt index ($I_2$) from 2 g/10 mins to 6 g/10 mins as determined in accordance with ASTM D1238 (190° C., 2.16 kg, Procedure B), and a conventional molecular weight distribution (MWD=Mw/Mn, conv.) by the conventional calibration of the triple detector gel permeation chromatography (TDGPC) method from 5 to 11. The ionomer includes an ethylene acid copolymer, in which from 15% to 70% of the carboxylic acid groups are neutralized as carboxylic acid salts that include sodium cations. The ethylene acid copolymer is the polymerized reaction product of: at least 50% by wt. ethylene, based on the total wt. % of the monomers present in the ethylene acid copolymer; from 2 wt. % to 30 wt. % of monocarboxylic acid monomer, based on the total wt. % of the monomers present in the ethylene acid copolymer; and from 0 wt. % to 25 wt. % of alkyl acrylate, based on the total wt. % of the monomers present in the ethylene acid copolymer.

Embodiments of this disclosure include coated substrates. The coated substrates include a substrate; and a coating comprising the polymer blend of this disclosure.

DETAILED DESCRIPTION

Embodiments of this disclosure include a polymer blend. The polymer blend includes at least 90% by weight low density polyethylene (LDPE) polymer and from 1% to 10% by weight ionomer.

In some embodiments of the polymer blend, the LDPE polymer has a melt index ($I_2$) from 2 g/10 mins to 6 g/10 mins as determined in accordance with ASTM D1238 (190° C., 2.16 kg). In various embodiments, the LDPE polymer has a melt index ($I_2$) from 3 g/10 mins to 5 g/10 mins, or from 2 g/10 mins to 4.5 g/10 mins.

In one or more embodiments of the polymer blend, the LDPE polymer has a molecular weight distribution (MWD=Mw/Mn) from 5 to 11, from 8 to 10, or 8.5 to 11 as determined by a conventional gel permeation chromatography method.

In some embodiments of the polymer blend, the LDPE polymer is a polymer produced from a tubular reactor. The LDPE polymer may have a density of 0.910 g/cc to 0.930 g/cc. In some embodiments, the LDPE polymer may have a density of from 0.910 g/cc to 0.920 g/cc, from 0.916 g/cc to 0.930 g/cc, from 0.918 g/cc to 0.926 g/cc, or 0.915 g/cc to 0.920 g/cc.

In one or more embodiments, the polymer blend includes from 1 wt. % to 7 wt. % or from 1% to 5% by wt. of the ionomer. In some embodiments, the polymer blend includes from 3 wt. % to 6 wt. %, from 4 wt. % to 6 wt. %, or from 5 wt. % to 7 wt. % of the ionomer.

In one or more embodiments of the polymer blend, the ionomer includes an ethylene acid copolymer, in which the acid copolymer has from 15% to 70% of the carboxylic acid groups neutralized as carboxylic acid salts comprising sodium cations. The percentage is based on the total number of acid groups in the polymer. In some embodiments, the ethylene acid copolymer has from 40% to 60%, from 30% to 70%, or from 40% to 70% of the carboxylic acid groups neutralized as carboxylic acid salts comprising sodium cations.

The ethylene acid copolymer is the polymerized reaction product of: at least 50% by wt. ethylene, based on the total wt. % of the monomers present in the ethylene acid copolymer; from 2 wt. % to 30 wt. % of monocarboxylic acid monomer, based on the total wt. % of the monomers present in the ethylene acid copolymer; and from 0 to 25 wt. % of alkyl acrylate, based on the total wt. % of the monomers present in the ethylene acid copolymer.

In one or more embodiments, the ethylene acid copolymer is the polymerized reaction product of ethylene monomer, monocarboxylic acid monomer, and optionally alkyl acrylate monomer. The monocarboxylic acid monomer may be present in amounts from 2 wt. % to 25 wt. %, 8 wt. % to 25 wt. %, 8 wt. % to 20 wt. %, 5 wt. % to 23 wt. %, 15 wt. % to 30 wt. % or 20 to 25 wt. % based on the total wt. % of the monomers present in the ethylene acid copolymer. The alkyl acrylate may be present in amounts from 0 wt. % to 20 wt. %, 1 wt. % to 10 wt. %, or 4 wt. % to 15 wt. % based on the total wt. % of the monomers present in the ethylene acid copolymer.

In some embodiments of the polymer blend, the alkyl acrylate of the acid copolymer may be, by way of example and not limitation, methyl acrylate, ethyl acrylate, n-butyl acrylate, iso-butyl acrylate, or combinations thereof. In various embodiments, the alkyl acrylate is a $C_2$-$C_8$-alkyl acrylate, that is, an alkyl acrylate having an alkyl group with from 1 to 8 carbons.

In various embodiments of the polymer blend, the monocarboxylic acid monomer comprises acrylic acid, methacrylic acid, or combinations thereof.

In one or more embodiments of the polymer blend, the ionomer has a melt index ($I_2$) from 0.5 g/10 mins to 15 g/10 mins as determined in accordance with ASTM D1238 (190° C., 2.16 kg). In some embodiments, the ionomer has a melt index ($I_2$) from 4 g/10 mins to 10 g/10 mins, from 0.5 to 10 g/10 mins, or from 0.5 to 4 g/10 mins.

The ethylene acid copolymer may be prepared by standard free-radical copolymerization methods, using high pressure, operating in a continuous manner. Monomers are fed into the reaction mixture in a proportion relative to the monomer's activity and the amount of the monomer desired to be incorporated in the copolymer. In this way, uniform, near-random distribution of monomer units along the chain is achieved. Unreacted monomers may be recycled. Additional information on the preparation of ethylene acid copolymers can be found in U.S. Pat. Nos. 3,264,272 and 4,766,174, each of which is hereby incorporated by reference in its entirety.

Additional information on the preparation of ionomers can be found in U.S. Pat. Nos. 3,264,272 A, 3,322,734 A, and 9,783,352 B2, each of which is hereby incorporated by reference in its entirety.

As would be familiar to the skilled person, the components can be blended in various ways, for example, dry blending or melt blending the components. In one example, the LDPE polymer and ionomer may be dry blended, for example, by adding the components as pellets in an extruder, wherein the components are heated and mixed together and then coated on the substrate. Alternatively, the LDPE polymer and ionomer may be melt blended, wherein each component is melted and mixed in the compounder or extruder and then pelletized. Then, the pellets are fed into the extruder to make the coated substrate. Other blending methodologies for mixing the components are contemplated herein.

In some embodiments, the polymer blend does not include additives. In one or more embodiments, the polymer blend may include additives. The polymer blend can additionally include small amounts of additives including plasticizers, stabilizers including viscosity stabilizers, hydrolytic stabilizers, primary and secondary antioxidants, ultraviolet light absorbers, anti-static agents, dyes, pigments or other coloring agents, inorganic fillers, fire-retardants, lubricants, reinforcing agents such as glass fiber and flakes, synthetic (for example, aramid) fiber or pulp, foaming or blowing agents, processing aids, slip additives, antiblock agents such as silica or talc, release agents, tackifying resins, or combinations of two or more thereof. Inorganic fillers, such as calcium carbonate, and the like can also be incorporated into the blend.

Various embodiments of this disclosure include a coated substrate. The coated substrate includes a substrate and a coating adhered to the substrate. The coating includes any of the polymer blends disclosed in this disclosure. In various embodiments, there is a tie layer disposed between the polymer substrate and the coating.

In one or more embodiments of the coated substrate, the substrate includes a metal substrate, a polymer substrate, or a paper substrate. In some embodiments, the polymer substrate includes polyester, polyethylene, polypropylene, polyamide, metalized polyester, metalized polyethylene, metalized polypropylene, or metalized polyamide. In various embodiments, the metal substrate may be aluminum.

In one or more embodiments, the coating of the coated substrate has a peak load peel strength of at least 2 N/in. In some embodiments, the coated substrate has a peak hot tack strength of at least 9.5 N/in within a seal bar temperature range of 120° C. to 160° C. as measured by ASTM F-1921 (Method B).

Embodiments of this disclosure include films of the polymer blends as previously described. The film is extruded from any polymer blend of this disclosure.

Hot Tack Strength is the force per unit length, in Newtons per inch, required to pull apart two films in a partially molten condition. This test is used to simulate the ability of a package to hold its seal, and not spill the contents, while the heat seal has not yet cooled. As the ionomer of this disclosure was blended into the LDPE, the hot tack strength increased as did the temperature range in which the hot tack was observed.

Polymerizations

The LDPE and acid copolymer used to make the ionomer are made by high pressure free-radical polymerization. For a high pressure, free-radical initiated polymerization process, two basic types of reactors are known. The first type is an agitated autoclave vessel having one or more reaction zones (the autoclave reactor). The second type is a jacketed tube having one or more reaction zones (the tubular reactor).

The pressure in each autoclave and tubular reactor zone of the process is typically from 100 MPa to 400 MPa, more typically from 120 MPa to 360 MPa, and even more typically from 150 MPa to 320 MPa.

The polymerization temperature in each tubular reactor zone of the process is typically from 100° C. to 400° C., from 130° C. to 360° C., or from 140° C. to 330° C.

The polymerization temperature in each autoclave reactor zone of the process is typically from 150° C. to 300° C., from 165° C. to 290° C., or from 180° C. to 280° C. One skilled in the art understands that polymerization temperatures in autoclave reactors are considerably lower than those of the tubular reactor, and thus, more favorable extractable levels are typically observed in polymers produced in an autoclave-based reactor systems.

A tubular reactor having at least three reaction zones may be used to produce the polymer blends of this disclosure.

For producing an inventive ethylene-based polymer, including an inventive LDPE, a high pressure, free-radical initiated polymerization process is typically used. Typically, a jacketed tube is used as a reactor, which has one or more reaction zones. Suitable, but not limiting, reactor lengths may be from 100 to 3000 meters (m), or from 1000 to 2000 meters. The beginning of a reaction zone for the reactor is typically defined by the side injection of initiator of the reaction, ethylene, chain transfer agent (or telogen), as well as any combination thereof. A high pressure process can be carried out in one or more tubular reactors, having one or more reaction zones, or in a combination of autoclave and tubular reactors, each comprising one or more reaction zones.

A chain transfer agent can be used to control molecular weight. In a preferred embodiment, one or more chain transfer agents (CTAs) are added to an inventive process. Typical CTA's that can be used include, but are not limited to, propylene, n-butane, 1-butene, isobutane, propionaldehyde, and methyl ethyl ketone. In one embodiment, the amount of CTA used in the process is from 0.03 to 10 weight percent of the total reaction mixture. Ethylene used for the production of the ethylene-based polymer may be purified ethylene, which is obtained by removing polar components from a loop recycle stream, or by using a reaction system configuration, such that only fresh ethylene is used for making the inventive polymer. It is not typical that only purified ethylene is required to make the ethylene-based polymer. In such cases ethylene from the recycle loop may be used. In one embodiment, the ethylene-based polymer is a LDPE.

Initiators

The process to produce the LDPE polymer of this disclosure is a free-radical polymerization process. The type of free-radical initiator to be used in the present process is not critical, but preferably one of the initiators applied should allow high-temperature operation in the range from 300° C. to 350° C. Examples of suitable free-radical initiators include organic peroxides, such as peresters, perketals, peroxy ketones, percarbonates, and cyclic multifunctional peroxides. These organic peroxy initiators are added to the reactor at from 0.005 wt. % to 0.2 wt. %, based on the total weight of polymerizable monomers in the reactor. Peroxides are typically injected as diluted solutions in a suitable solvent, for example, in a hydrocarbon solvent.

Other suitable initiators include azodicarboxylic esters, azodicarboxylic dinitriles and 1,1,2,2-tetramethylethane derivatives, and other components capable of forming free radicals in the desired operating temperature range.

Definitions

Unless stated to the contrary, implicit from the context, or customary in the art, all parts and percentages are based on weight, and all test methods are current as of the filing date of this disclosure.

The terms "blend" or "polymer blend," as used in this disclosure, mean an intimate physical mixture of two or more polymers without chemical reaction between or among the polymers. A blend may be miscible and without phase separation at a molecular level or may be immiscible and evidence some degree of phase separation at a molecular level. A blend may include, but need not include, one or more domain configurations that can be determined from transmission electron spectroscopy, light scattering, x-ray scattering, and other methods known in the art. The blend may be affected by physically mixing the two or more polymers on a macro level or on a micro level. Examples of physical mixing on a macro level include melt blending of resins or compounding. An example of physical mixing on a micro level includes simultaneous formation of the two or more polymers within the same reactor.

The term "polymer" refers to a polymeric molecule prepared by polymerizing monomers, whether of the same or a different type. The generic term polymer thus embraces the terms "homopolymer" and "copolymer." The term "homopolymer" refers to polymers prepared from only one type of monomer; the term "copolymer" refers to polymers prepared from two or more different monomers.

The term "ethylene-based polymer" or "ethylene polymer" refers to a polymer that comprises a majority amount of polymerized ethylene, based on the total weight of the polymer. Ethylene-based polymers and ethylene polymers may be ethylene homopolymers or may include one or more than one comonomer, provided ethylene has the greatest weight fraction of the polymer, among all monomers in the polymer.

The term "monocarboxylic acid monomer" means a molecule having a reactive portion, such as a vinyl or vinylene, that may bond to other monomers to form a polymer and a carboxylic acid (—C(O)OH) moiety that is not included in the reactive portion. For example, (meth)acrylic acid is a monocarboxylic acid monomer, in which the vinylene is the reactive portion and there is a carboxylic acid. The term "(meth)acrylic acid" includes methacrylic acid and/or acrylic acid and "(meth)acrylate" includes methacrylate, acrylate, or combinations of methacrylate and acrylate.

TEST METHODS

Density: Samples for density measurement are prepared according to ASTM D 1928. Polymer samples are pressed at 190° C. and 30,000 psi for three minutes, and then at 21° C. and 207 MPa for one minute. Measurements are made within one hour of sample pressing using ASTM D792, Method B.

Melt Index: Melt index, or $I_2$, (grams/10 minutes or dg/min) is measured in accordance with ASTM D 1238, Condition 190° C./2.16 kg, Procedure B.

Triple Detector Gel Permeation Chromatography (3D-GPC)

The chromatographic system includes a PolymerChar GPC-IR (Valencia, Spain) high temperature GPC chromatograph equipped with an internal IR5 infra-red detector (IR5) coupled to a Precision Detectors (Now Agilent Technologies) 2-angle laser light scattering (LS) detector Model 2040. For all Light scattering measurements, the 15 degree angle is used for measurement purposes. The autosampler oven compartment is set at 160° C., and the column compartment is set at 150° C. The columns that may be used include 4 Agilent "Mixed A" 30 cm 20-micron linear mixed-bed columns. The chromatographic solvent that may be used includes 1,2,4 trichlorobenzene and that contains 200 ppm of butylated hydroxytoluene (BHT). The solvent source is nitrogen sparged. The injection volume that may be used includes 200 microliters (μL) and the flow rate was 1.0 milliliters/minute.

Calibration of the GPC column set is performed with at least 20 narrow molecular weight distribution polystyrene standards with molecular weights ranging from 580 to 8,400,000 arranged in 6 "cocktail" mixtures with at least a decade of separation, meaning that there is an order of magnitude of approximately a factor of 10, between individual molecular weights. The standards are purchased from Agilent Technologies. The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80 degrees Celsius with gentle agitation for 30 minutes. The polystyrene standard peak molecular weights are converted to polyethylene molecular weights using Equation 1 (as described in Williams and Ward, J. Polym. Sci., Polym. Let., 6, 621 (1968)):

$$M_{polyethylene} = A \times (M_{polystyrene})^B \quad \text{(EQ1)}$$

where M is the molecular weight, A has a value of 0.4315 and B is equal to 1.0.

A fifth order polynomial is used to fit the respective polyethylene-equivalent calibration points. A small adjustment to A (from approximately 0.415 to 0.44) is made to correct for column resolution and band-broadening effects such that NIST standard NBS 1475 is obtained at 52,000 g/mol Mw.

The total plate count of the GPC column set is performed with Eicosane (prepared at 0.04 g in 50 milliliters of TCB and dissolved for 20 minutes with gentle agitation.) The plate count (Equation 2) and symmetry (Equation 3) are measured on a 200 microliter injection according to the following equations:

$$\text{Plate Count} = 5.54 * \left( \frac{RV_{Peak\ Max}}{\text{Peak Width at } \frac{1}{2} \text{ height}} \right)^2 \quad \text{(EQ2)}$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad \text{(EQ3)}$$

where RV is the retention volume in milliliters and the peak width is in milliliters, Peak max is the maximum position of the peak, one tenth height is ⅒ height of the peak maximum, and where rear peak refers to the peak tail at later retention volumes than the peak max and where front peak refers to the peak front at earlier retention volumes than the peak max. The plate count for the chromatographic system should be greater than 24,000 and symmetry should be between 0.98 and 1.22.

Samples are prepared in a semi-automatic manner with the PolymerChar "Instrument Control" Software, wherein the samples are weight-targeted at 2 mg/mL, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $Mn_{(GPC)}$, $Mw_{(GPC)}$, and $Mz_{(GPC)}$ are based on GPC results using the internal IRS detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum_i IR_i}{\sum_i (IR_i / M_{polyethylene_i})} \quad \text{(EQ4)}$$

$$Mw_{(GPC)} = \frac{\sum_i (IR_i * M_{polyethylene_i})}{\sum_i IR_i} \quad \text{(EQ5)}$$

$$Mz_{(GPC)} = \frac{\sum_i (IR_i * M_{polyethylene_i}^2)}{\sum_i (IR_i * M_{polyethylene_i})} \quad \text{(EQ6)}$$

In order to monitor the deviations over time, a flowrate marker (decane) is introduced into each sample via a micropump controlled with the PolymerChar GPC-IR system. This flowrate marker (FM) was used to linearly correct the pump flowrate ($\text{Flowrate}_{(nominal)}$) for each sample by RV alignment of the respective decane peak within the sample ($RV_{(FM\ Sample)}$) to that of the decane peak within the narrow standards calibration ($RV_{(FM\ Calibrated)}$). Any changes in the time of the decane marker peak is assumed to be related to a linear-shift in flowrate ($\text{Flowrate}_{(effective)}$) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−2% of the nominal flowrate.

$$\text{Flowrate}_{(effective)} = \text{Flowrate}_{(nominal)} * (RV_{(FM\ Calibrated)} / RV_{(FM\ Sample)}) \quad \text{(EQ7)}$$

The Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard (Mw/Mn>3) to the narrow standard column calibration results from the narrow standards calibration curve using PolymerChar GPCOne™ Software.

Hot Tack Strength

Hot tack measurements on the film are performed using an Enepay commercial testing machine according to ASTM F-1921 (Method B). Prior to testing, the samples are conditioned for a minimum of 40 hrs at 23° C. and 50% R.H. (relative humidity) per ASTM D-618 (Procedure A). The hot tack test simulates the filling of material into a pouch or bag before the seal has had a chance to cool completely.

Sheets of dimensions 8.5 inches by 14 inches are cut from the coated substrate, with the longest dimension in the machine direction. Strips 1 inch wide and 14 inches long are cut from the coated substrate. Samples need only be of sufficient length for clamping. Tests are performed on these samples over a range of temperatures and the results reported as the maximum load as a function of seal bar temperature. Typical temperature steps are 5° C. or 10° C. with 6 replicates performed at each temperature. For purposes of this disclosure, testing according to ASTM F-1921 (Method B) was completed with:
- Specimen Dimension: 1.0 inch×14 inch
- Specimen Width: 25.4 mm (1.0 inch)
- Sealing Pressure: 0.275 N/mm²
- Sealing Dwell Time: 0.5 s
- Delay time: 0.18 s
- Peel speed: 200 mm/s
- Seal depth=0.5 inch
- Specimen Thickness=7.2 mil
- Coating Thickness=1.2 mil
- Kraft paper=6.0 mil The data are reported as a hot tack curve where the Average Hot Tack Force (N) is plotted as a function of temperature. The coated substrate is comprised of the polymer extrusion coated onto Kraft paper. The thickness of Kraft paper is 6 mil. The coating thickness is 1.2 mil.

The average of improvement in hot tack strength (N/in) is calculated from the equation below (hot tack strength at five seal bar temperatures of 120, 130, 140, 150 and 160° C. are selected for calculation):

$$\frac{\sum_{i=120^\circ C.}^{i=160^\circ C.} \left[ \left( \begin{array}{c} \text{Hot tack strength of } LDPE + \\ \text{ionomer} \end{array} \right) - (\text{Hot tack strength of pure } LDPE) \right] \text{ at } T_i}{5}$$

Peel Strength as Measured by the Peel Test

The polymer or the polymer blend is extrusion-coated on an aluminum sheet (aluminum foil laminated with LDPE and white paper with a total thickness of 5.2 to 5.5 mil) via an extrusion coating process. The coating is applied to the aluminum side and has a thickness of 1.2 mil. Masking tape is placed on a portion of the aluminum sheet before the polymer or polymer blend is extruded and coated onto the aluminum sheet. Since there is weak adhesion between the masking tape and coating, the masking tape can be peeled-off the coating prior to the Peel Test. Then, the Peel Test is used to obtain the peel strength between the coating and the aluminum sheet.

Prior to testing of the adhesion strength, the samples are conditioned for a minimum of 40 hrs at 23° C. (±2° C.) and 50% (±10%) relative humidity (R.H).

The extrusion-coated sheet to be tested is cut into 1 inch wide strips along the machine direction with the longer side oriented along the machine direction. The coating is peeled off from the aluminum sheet (starting from the location with the masking tape), and then the two jaws of the tensile test machine grips the ends of the peeled-off coating and aluminum sheet. Then the whole sample is slowly pulled at 1 in/min to remove the slack. The sample is then tested at 12 in/min, and the peak load and average load over 3 inches (from 1 inch to 4 inches) are reported.

The peel strength improvement (%) is obtained from the equation below.

$$\frac{(\text{peel strength of } LDPE + \text{ionomer}) - (\text{peel strength of pure } LDPE)}{\text{peel strength of pure } LDPE} * 100$$

The peel strength is the peak load obtained from the peel test, and the reported peel strength is the average of five specimen tested.

Extrusion Coating

The extrusion coating trial is performed using the following standard coating procedures. In brief, monolayer coatings are extruded using a 3-layer extrusion coating line, using only the primary 3.5-inch diameter extruder (30:1 L/D) powered by a 150 HP Eurotherm drive. The extruder barrel consists of 6 heater zones with a temperature profile from zones 1 to 6=179/230/286/316/317/318° C. (354/446/546/601/603/605° F.). A Cloeren 30-inch coat hanger EBR III (Edge Bead Reduction) internal deckle die is used, and a 0.5-0.6 mm (0.020") die gap and a 153 mm (6 inches) air gap were set. The line is equipped with a 30-inch chill roll, nip roll, backing roll, and shear slitter.

Extrusion coating runs are performed at 30 gsm (grams per square meter) at 600° F. (315° C.), 90 RPM screw speed and 250 lbs/hr, 24-inch die width, 20-mil die gap, which translates into a coating thickness of 1.2 mil (30 microns) at 440 ft/min.

EXAMPLES

Example compositions were prepared, and polymer characteristics of each were measured.

TABLE 1

Composition and characteristics of the ionomer polymers in the Example and Comparative Blends

| Ionomer or Acid Copolymer | Melt Index (dg/min) | Initial Acid level (wt %) | Neutralization percentage (%) | Ion type | Termonomer of iBA* (wt %) |
|---|---|---|---|---|---|
| Ionomer 1 | 1.3 | 10 | 55 | Sodium | 4 |
| Ionomer 2 | 0.8 | 15 | 56 | Sodium | 0 |
| Ionomer 3 | 3.5 | 15 | 27 | Sodium | 0 |
| Acid Copolymer A | 10 | 9 | 0 | none | 0 |

*iBA is an abbreviation for iso-butylacrylate.

TABLE 2

Composition and characteristics of the LDPE polymers in the Example and Comparative Blends

| Samples | Melt Index (dg/min) | MWD (Mw/Mn, Conv.) | Density (g/cm³) |
|---|---|---|---|
| AGILITY ™ EC 7000 | 3.9 | 8.82 | 0.919 |
| Dow LDPE 5005 | 5.7 | 9.29 | 0.922 |
| AGILITY ™ EC 7030 | 2.5 | 8.97 | 0.918 |
| Dow LDPE 722 | 8.0 | 10.81 | 0.918 |
| Dow LDPE 4016 | 16 | 9.54 | 0.919 |
| Dow LDPE 4010 | 10 | >11.0 | 0.917 |
| Dow LDPE 6211 | 2.3 | >11.0 | 0.918 |

™ Trademark of Dow Inc.

Examples 1 to 6 and Comparative examples C1 to C22 were prepared by dry blending the LDPE and the ionomer or acid co-polymer first via a tumbler blender, and then the blend was fed into the hopper of the extruder to complete the extrusion coating process.

Example 1 was a polymer blend prepared from 95% by weight AGILITY™ EC 7000 manufactured by Dow Inc. as the LDPE component and 5% Ionomer 1 manufactured by Dow Inc. as the sodium neutralized ionomer copolymer.

Example 2 was a polymer blend prepared from 95% by weight of LDPE 5005 manufactured by Dow Inc. as the LDPE component and 5% Ionomer 1 manufactured by Dow Inc. as the sodium neutralized ionomer copolymer.

Example 3 was a polymer blend prepared from 95% by weight of AGILITY™ EC 7030 manufactured by Dow Inc. as the LDPE component and 5% Ionomer 1 manufactured by Dow Inc. as the sodium neutralized ionomer copolymer.

Example 4 was a polymer blend prepared from 95% by weight of AGILITY™ EC 7000 manufactured by Dow Inc. as the LDPE component and 5% Ionomer 2 manufactured by Dow Inc. as the sodium neutralized ionomer copolymer.

Example 5 was a polymer blend prepared from 95% by weight of LDPE 5005 manufactured by Dow Inc. as the LDPE component and 5% Ionomer 2 manufactured by Dow Inc. as the sodium neutralized ionomer copolymer.

Example 6 was a polymer blend prepared from 95% by weight of AGILITY™ EC 7030 manufactured by Dow Inc. as the LDPE component and 5% Ionomer 2 manufactured by Dow Inc. as the sodium neutralized ionomer copolymer.

Comparative Example C1 was a polymer blend prepared from 95% by weight of LDPE 6211 manufactured by Dow Inc. as the LDPE component and 5% Ionomer 1 manufactured by Dow Inc. as the sodium neutralized ionomer copolymer.

Comparative Example C2 was a polymer blend prepared from 95% by weight of LDPE 5005 manufactured by Dow Inc. as the LDPE component and 5% Ionomer 3 manufactured by Dow Inc. as the sodium neutralized ionomer copolymer.

Comparative Example C3 was a polymer blend prepared from 95% by weight of LDPE 722 manufactured by Dow Inc. as the LDPE component and 5% Ionomer 3 manufactured by Dow Inc. as the sodium neutralized ionomer copolymer.

Comparative Example C4 was a polymer blend prepared from 95% by weight of LDPE 4016 manufactured by Dow Inc. as the LDPE component and 5% Ionomer 3 manufactured by Dow Inc. as the sodium neutralized ionomer copolymer.

Comparative Example C5 was a polymer blend prepared from 95% by weight of LDPE 4010 manufactured by Dow Inc. as the LDPE component and 5% Ionomer 3 manufactured by Dow Inc. as the sodium neutralized ionomer copolymer.

Comparative Example C6 was a polymer blend prepared from 95% by weight of LDPE 6211 manufactured by Dow Inc. as the LDPE component and 5% Ionomer 3 manufactured by Dow Inc. as the sodium neutralized ionomer copolymer.

Comparative Example C7 was a polymer blend prepared from 95% by weight of LDPE 722 manufactured by Dow Inc. as the LDPE component and 5% Ionomer 2 manufactured by Dow Inc. as the sodium neutralized ionomer copolymer.

Comparative Example C8 was a polymer blend prepared from 95% by weight of LDPE 4016 manufactured by Dow Inc. as the LDPE component and 5% Ionomer 2 manufactured by Dow Inc. as the sodium neutralized ionomer copolymer.

Comparative Example C9 was a polymer blend prepared from 95% by weight of LDPE 6211 manufactured by Dow Inc. as the LDPE component and 5% Ionomer 2 manufactured by Dow Inc. as the sodium neutralized ionomer copolymer.

Comparative Example C10 was a polymer blend prepared from 95% by weight of LDPE 722 manufactured by Dow Inc. as the LDPE component and 5% Ionomer 1 manufactured by Dow Inc. as the sodium neutralized ionomer copolymer.

Comparative Example C11 was a polymer blend prepared from 95% by weight of LDPE 4016 manufactured by Dow Inc. as the LDPE component and 5% Ionomer 1 manufactured by Dow Inc. as the sodium neutralized ionomer copolymer.

Comparative Example C12 was a polymer blend prepared from 95% by weight of LDPE 4010 manufactured by Dow Inc. as the LDPE component and 5% Ionomer 1 manufactured by Dow Inc. as the sodium neutralized ionomer copolymer.

Comparative Example C13 was a polymer blend prepared from 95% by weight of AGILITY™ EC 7000 manufactured by Dow Inc. as the LDPE component and 5% Ionomer 3 manufactured by Dow Inc. as the sodium neutralized ionomer copolymer.

Comparative Example C14 was a polymer blend prepared from 95% by weight of AGILITY™ EC 7030 manufactured by Dow Inc. as the LDPE component and 5% Ionomer 3 manufactured by Dow Inc. as the sodium neutralized ionomer copolymer.

Comparative Example C15 was a polymer blend prepared from 95% by weight of LDPE 4010 manufactured by Dow Inc. as the LDPE component and 5% Ionomer 2 manufactured by Dow Inc. as the sodium neutralized ionomer copolymer.

Comparative Example C16 was a polymer blend prepared from 95% by weight of AGILITY™ EC 7000 manufactured by Dow Inc. as the LDPE component and 5% Acid Copolymer A manufactured by Dow Inc.

Comparative Example C17 was a polymer blend prepared from 95% by weight of LDPE 5005 manufactured by Dow Inc. as the LDPE component and 5% Acid Copolymer A manufactured by Dow Inc.

Comparative Example C18 was a polymer blend prepared from 95% by weight of LDPE 722 manufactured by Dow Inc. as the LDPE component and 5% Acid Copolymer A manufactured by Dow Inc.

Comparative Example C19 was a polymer blend prepared from 95% by weight of LDPE 4016 manufactured by Dow Inc. as the LDPE component and 5% Acid Copolymer A manufactured by Dow Inc.

Comparative Example C20 was a polymer blend prepared from 95% by weight of LDPE 4010 manufactured by Dow Inc. as the LDPE component and 5% Acid Copolymer A manufactured by Dow Inc.

Comparative Example C21 was a polymer blend prepared from 95% by weight of AGILITY™ EC 7030 manufactured by Dow Inc. as the LDPE component and 5% Acid Copolymer A manufactured by Dow Inc.

Comparative Example C22 was a polymer blend prepared from 95% by weight of LDPE 6211 manufactured by Dow Inc. as the LDPE component and 5% Acid Copolymer A manufactured by Dow Inc.

Characteristics of each of the polymer blends and comparative polymers are summarized in Tables 1-5. The polymers were tested using the methods previously described.

TABLE 3

Increase of hot tack strength and peel strength improvement

| Example | Average of hot tack strength improvement (N/in) | Peel Strength improved (%) |
| --- | --- | --- |
| Example 1 | 2.7 | 242 |
| Example 2 | 1.2 | 348 |
| Example 3 | 4.1 | 39 |

TABLE 3-continued

Increase of hot tack strength and peel strength improvement

| Example | Average of hot tack strength improvement (N/in) | Peel Strength improved (%) |
|---|---|---|
| Example 4 | 2.7 | 207 |
| Example 5 | 1.1 | 426 |
| Example 6 | 3.6 | 103 |
| Comparative C1 | Not processable* | |
| Comparative C2 | 0.5 | 171 |
| Comparative C3 | 0.4 | 36 |
| Comparative C4 | 0.8 | 5 |
| Comparative C5 | 0.4 | 0 |
| Comparative C6 | Not processable* | |
| Comparative C7 | 0.2 | 411 |
| Comparative C8 | 0.0 | 87 |
| Comparative C9 | Not processable* | |
| Comparative C10 | 0.9 | 126 |
| Comparative C11 | 1.4 | 78 |
| Comparative C12 | 1.1 | 0 |
| Comparative C13 | 1.1 | 100 |
| Comparative C14 | 1.4 | 18 |
| Comparative C15 | 1.6 | 1 |
| Comparative C16 | 0.0 | 94 |
| Comparative C17 | 0.0 | 11 |
| Comparative C18 | 0.3 | 42 |
| Comparative C19 | 0.3 | 183 |
| Comparative C20 | 0.2 | 0 |
| Comparative C21 | 0.0 | 34 |
| Comparative C22 | Not processable* | |

*The blend cannot be run on the extrusion coating line with a line speed ≥ 440 ft/min. (fabrication methods are previously described)

The calculations for determining the improvement in N/in and the percent improvement of the peel strength and the improvement of the hot tack were previously described.

TABLE 4

Hot tack strength of example polymer blends

| Example | Hot Tack Strength (N/in) | | | | | | |
|---|---|---|---|---|---|---|---|
| | 100° C. | 110° C. | 120° C. | 130° C. | 140° C. | 150° C. | 160° C. |
| AGILITY™ EC 7000 | 0.070 | 0.797 | 6.65 | 7.11 | 6.77 | 6.30 | 5.72 |
| LDPE 5005 | 0.100 | 0.353 | 8.00 | 7.60 | 7.98 | 8.53 | 7.64 |
| LDPE 722 | 0.176 | 0.427 | 8.27 | 8.98 | 9.24 | 7.70 | 6.46 |
| LDPE 4016 | 0.167 | 0.939 | 10.53 | 9.28 | 7.90 | 7.09 | 6.66 |
| LDPE 4010 | 0.0867 | 1.83 | 8.90 | 8.37 | 7.62 | 6.82 | 6.45 |
| AGILITY™ EC 7030 | 0.0567 | 2.60 | 5.05 | 5.23 | 5.23 | 5.32 | 4.27 |
| Example 1 | 0.107 | 5.42 | 8.02 | 9.87 | 10.03 | 9.68 | 8.40 |
| Example 2 | 0.126 | 0.198 | 8.61 | 9.43 | 10.27 | 9.32 | 8.12 |
| Example 3 | 0.067 | 5.58 | 7.71 | 8.90 | 10.06 | 9.57 | 9.57 |
| Example 4 | 0.155 | 0.898 | 9.03 | 9.06 | 9.94 | 10.14 | 8.93 |
| Example 5 | 0.0833 | 0.163 | 9.11 | 10.22 | 9.69 | 8.38 | 7.61 |
| Example 6 | 0.093 | 3.01 | 7.20 | 9.87 | 9.77 | 8.79 | 7.85 |
| Comp. C1 | —Not processable* | — | — | — | — | — | — |
| Comp. C2 | 0.151 | 0.202 | 7.76 | 8.91 | 9.40 | 8.65 | 7.70 |
| Comp. C3 | 0.107 | 3.81 | 9.54 | 10.11 | 8.68 | 7.05 | 7.18 |
| Comp. C4 | 0.167 | 3.59 | 11.63 | 9.91 | 8.83 | 8.10 | 6.94 |
| Comp. C5 | 0.073 | 4.21 | 9.32 | 8.85 | 7.99 | 7.31 | 6.79 |
| Comp. C6 | —Not processable* | — | — | — | — | — | — |
| Comp. C7 | 0.152 | 1.07 | 8.98 | 9.24 | 8.58 | 7.93 | 7.13 |
| Comp. C8 | 0.090 | 5.02 | 12.11 | 9.01 | 7.24 | 6.74 | 6.51 |
| Comp. C10 | 0.090 | 2.43 | 10.34 | 10.53 | 9.23 | 8.08 | 7.19 |
| Comp. C11 | 0.174 | 1.10 | 12.53 | 10.37 | 9.02 | 8.81 | 7.73 |
| Comp. C12 | 0.187 | 1.32 | 9.55 | 9.31 | 9.32 | 8.55 | 7.00 |
| Comp. C13 | 0.077 | 4.16 | 7.53 | 7.74 | 7.62 | 7.89 | 7.23 |
| Comp. C14 | 0.103 | 2.41 | 5.96 | 6.77 | 7.07 | 6.38 | 6.23 |
| Comp. C15 | 0.157 | 4.06 | 10.36 | 10.05 | 8.81 | 8.74 | 8.01 |
| Comp. C16 | 0.093 | 3.20 | 6.18 | 7.21 | 6.83 | 6.53 | 5.98 |
| Comp. C17 | 0.158 | 0.141 | 7.50 | 7.62 | 7.97 | 8.15 | 6.85 |
| Comp. C18 | 0.169 | 0.611 | 9.05 | 9.18 | 8.86 | 8.13 | 7.13 |
| Comp. C19 | 0.165 | 0.875 | 11.48 | 9.944 | 8.13 | 7.26 | 6.08 |
| Comp. C20 | 0.077 | 4.00 | 8.22 | 8.82 | 8.06 | 7.27 | 6.92 |
| Comp. C21 | 0.103 | 2.38 | 4.57 | 4.86 | 5.53 | 4.88 | 4.60 |
| Comp. C22 | Not processable* | — | — | — | — | — | — |

Figure 1:
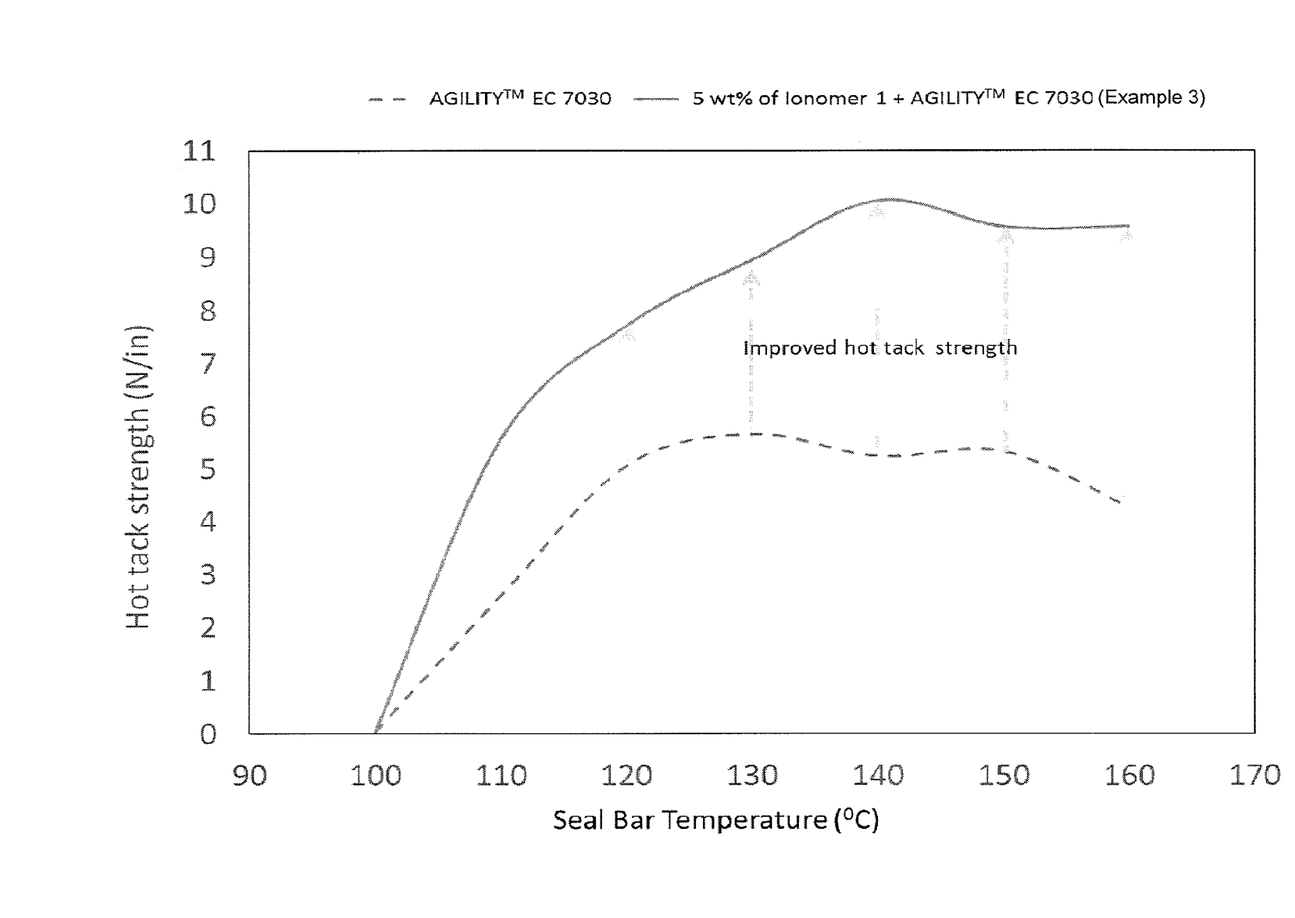
FIG. 1 is a graph of the hot tack strength as a function of seal bar temperatures for Example 3 and AGILITY EC 7030™.

FIG. 1, a graph of the hot tack strength as a function of seal bar temperatures shows Example 3 having a greater hot tack strength than the comparative AGILITY™ EC 7030. The results in FIG. 1 illustrate that the blend of an ionomer and a LDPE polymer has a greater hot tack strength than a LDPE resin.

TABLE 5

Data of Peel Strength of example polymer blends

| Example | | Peak Strength (N/in) |
|---|---|---|
| AGILITY ™ EC 7000 | Peak Load | 1.14 |
| | Mean Load | 0.625 |
| LDPE 5005 | Peak Load | 0.468 |
| | Mean Load | 0.197 |
| LDPE 722 | Peak Load | 0.402 |
| | Mean Load | 0.196 |
| LDPE 4016 | Peak Load | 0.343 |
| | Mean Load | 0.0674 |
| LDPE 4010 | Peak Load | 0.417 |
| | Mean Load | 0.0628 |
| AGILITY ™ EC 7030 | Peak Load | 2.29 |
| | Mean Load | 1.55 |
| Example 1 | Peak Load | 3.92 |
| | Mean Load | 3.32 |
| Example 2 | Peak Load | 2.10 |
| | Mean Load | 1.52 |
| Example 3 | Peak Load | 3.18 |
| | Mean Load | 2.71 |
| Example 4 | Peak Load | 3.53 |
| | Mean Load | 2.92 |
| Example 5 | Peak Load | 2.46 |
| | Mean Load | 1.79 |
| Example 6 | Peak Load | 4.66 |
| | Mean Load | 2.42 |
| Comp. C1 | Peak Load | not processable* |
| | Mean Load | — |
| Comp. C2 | Peak Load | 1.27 |
| | Mean Load | 0.814 |
| Comp. C3 | Peak Load | 0.548 |
| | Mean Load | 0.255 |
| Comp. C4 | Peak Load | 0.362 |
| | Mean Load | 0.136 |
| Comp. C5 | Peak Load | 0.389 |
| | Mean Load | 0.173 |
| Comp. C6 | Peak Load | Not processable* |
| | Mean Load | — |
| Comp. C7 | Peak Load | 2.05 |
| | Mean Load | 1.53 |
| Comp. C8 | Peak Load | 0.640 |
| | Mean Load | 0.326 |
| Comp. C10 | Peak Load | 0.910 |
| | Mean Load | 0.514 |
| Comp. C11 | Peak Load | 0.611 |
| | Mean Load | 0.220 |
| Comp. C12 | Peak Load | 0.387 |
| | Mean Load | 0.157 |
| Comp. C13 | Peak Load | 2.30 |
| | Mean Load | 1.69 |
| Comp. C14 | Peak Load | 2.71 |
| | Mean Load | 2.00 |
| Comp. C15 | Peak Load | 0.420 |
| | Mean Load | 0.200 |
| Comp. C16 | Peak Load | 2.23 |
| | Mean Load | 1.72 |
| Comp. C17 | Peak Load | 0.519 |
| | Mean Load | 0.251 |
| Comp. C18 | Peak Load | 0.570 |
| | Mean Load | 0.205 |
| Comp. C19 | Peak Load | 0.971 |
| | Mean Load | 0.411 |
| Comp. C20 | Peak Load | 0.369 |
| | Mean Load | 0.138 |
| Comp. C21 | Peak Load | 3.07 |
| | Mean Load | 2.57 |
| Comp. C22 | Peak Load | Not processable* |
| | Mean Load | — |

The invention claimed is:

1. A polymer blend comprising:
   at least 90% by weight low density polyethylene (LDPE) polymer, wherein the LDPE polymer has a melt index ($I_2$) from 2 to 6 g/10 mins as determined in accordance with ASTM D1238 (190° C., 2.16 kg, Procedure B), and a molecular weight distribution (MWD=Mw/Mn) from 5 to 11 as determined by a conventional gel permeation chromatography method; and
   from 1 wt. % to 10% by weight ionomer, the ionomer comprising an ethylene acid copolymer having from 15% to 70% of carboxylic acid groups neutralized as carboxylic acid salts comprising sodium cations based on a total number of acid groups in the copolymer, wherein the ethylene acid copolymer is a polymerized reaction product of:
   at least 50% by wt. ethylene, based on a total wt. % of monomers present in the ethylene acid copolymer;
   from 2 wt. % to 30 wt. % of monocarboxylic acid monomer, based on the total wt. % of the monomers present in the ethylene acid copolymer; and
   from 0 wt. % to 25 wt. % of alkyl acrylate, based on the total wt. % of the monomers present in the ethylene acid copolymer.

2. The polymer blend of claim 1, wherein the LDPE has a density of 0.910 g/cc to 0.930 g/cc and a conventional molecular weight distribution of 8.5 to 11.

3. The polymer blend of claim 1, wherein the LDPE has a melt index ($I_2$) from 2 g/10 mins to 4.5 g/10 mins.

4. The polymer blend of claim 1, wherein the ionomer has a melt index ($I_2$) from 0.5 g/10 mins to 15 g/10 mins.

5. The polymer blend of claim 1, wherein the ionomer has a melt index ($I_2$) from 0.5 g/10 mins to 4 g/10 mins.

6. The polymer blend of claim 1, wherein the polymer blend comprises from 1% by wt. to 5% by wt. of the ionomer.

7. The polymer blend of claim 1, wherein the ionomer has from 40% to 60% of acid groups neutralized by sodium cation based on the total number of acid groups.

8. The polymer blend of claim 1, wherein the ethylene acid copolymer comprises at least 70% by wt. ethylene, and from 8 wt. % to 25% by wt. of monocarboxylic acid monomer.

9. The polymer blend of claim 1, wherein the ethylene acid copolymer comprises at least 70% by wt. ethylene, and from 8 wt. % to 20% by wt. of monocarboxylic acid monomer.

10. The polymer blend of claim 1, wherein the alkyl acrylate comprises methyl acrylate, ethyl acrylate, n-butyl acrylate or iso-butyl acrylate, or combinations thereof, and the monocarboxylic acid monomer comprises one or more of acrylic acid, methacrylic acid, or combinations thereof.

11. A coated substrate comprising:
   a substrate; and
   a coating comprising the polymer blend of claim 1 adhered to the substrate.

12. The coated substrate of claim 11, wherein the substrate comprises a metal substrate, a paper substrate, or a polymer substrate.

13. The coated substrate of claim 12, wherein the polymer substrate comprises polyester or metalized polyester.

14. The coated substrate of claim 12, wherein the polymer substrate is metalized.

15. The coated substrate of claim 12, wherein the polymer substrate is polypropylene, polyethylene, metalized polypropylene, or metalized polyethylene.

16. The coated substrate of claim 11, wherein the coated substrate has a peak hot tack strength of at least 9.5 N/in within a seal bar temperature range of 120° C. to 160° C. as measured by ASTM F-1921 (Method B).

17. The coated substrate of claim 11, wherein the coating has a peak load peel strength of at least 2 N/in as measured by the Peel Test.

18. A film comprising the polymer blend of claim 1.

* * * * *